US008975574B2

(12) United States Patent
Huiszoon et al.

(10) Patent No.: US 8,975,574 B2
(45) Date of Patent: Mar. 10, 2015

(54) WELL-LOGGING TOOL WITH AZIMUTHAL AND SPECTRAL RADIATION DETECTORS AND RELATED METHODS

(71) Applicant: Schlumberger Technology Corporation, Sugar Land, TX (US)

(72) Inventors: Cornelis Huiszoon, Houston, TX (US); Libai Xu, Katy, TX (US); Christian Stoller, Princeton Junction, NJ (US); Robert Little, Katy, TX (US); Peter Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/901,242

(22) Filed: May 23, 2013

(65) Prior Publication Data

US 2014/0346336 A1 Nov. 27, 2014

(51) Int. Cl.
*G01V 5/04* (2006.01)
*G01V 5/08* (2006.01)
*G01V 13/00* (2006.01)

(52) U.S. Cl.
CPC . *G01V 5/08* (2013.01); *G01V 13/00* (2013.01)
USPC ........................................................ 250/265

(58) Field of Classification Search
CPC ................................. G01V 11/00; G01V 1/50
USPC ........................ 250/265, 266, 264, 269–269.8
See application file for complete search history.

(56) References Cited

U.S. PATENT DOCUMENTS

| | | | |
|---|---|---|---|
| 5,408,097 A | 4/1995 | Wraight et al. | |
| 5,451,779 A * | 9/1995 | Spross et al. | 250/266 |
| 5,483,061 A | 1/1996 | Sloan | |
| 5,600,135 A | 2/1997 | Jacobson | |
| 5,608,214 A | 3/1997 | Baron et al. | |
| 6,300,624 B1 | 10/2001 | Yoo et al. | |
| 6,815,665 B2 * | 11/2004 | Storm et al. | 250/269.3 |
| 6,927,390 B2 | 8/2005 | Mickael | |
| 6,944,548 B2 | 9/2005 | Radtke et al. | |
| 7,081,616 B2 | 7/2006 | Grau et al. | |

(Continued)

FOREIGN PATENT DOCUMENTS

| | | |
|---|---|---|
| EP | 0860715 A1 | 8/1998 |
| WO | 2007146405 A2 | 12/2007 |
| WO | 2012012101 A2 | 1/2012 |

OTHER PUBLICATIONS

International Search Report and the Written Opinion for International Application No. PCT/US2014/039305 dated Sep. 23, 2014.

*Primary Examiner* — Kiho Kim
(74) *Attorney, Agent, or Firm* — Cathy Hewitt

(57) ABSTRACT

A well-logging tool may be positioned within a borehole of a subterranean formation. The well-logging tool may include a housing having an interior defining a dual-detector receiving chamber extending longitudinally, and having first and second portions, and a first azimuthal radiation detector carried by the first portion of the dual-detector receiving chamber. The first azimuthal radiation detector may include a first gamma-ray detector and a first photodetector associated with the first gamma-ray detector. The well-logging tool may include a second spectral radiation detector carried by the second portion of the dual-detector receiving chamber. The second spectral radiation detector may include a second gamma-ray detector and a second photodetector associated with the second gamma-ray detector.

17 Claims, 7 Drawing Sheets

(56) References Cited

U.S. PATENT DOCUMENTS

| | | |
|---|---|---|
| 7,202,456 B2 | 4/2007 | Mickael |
| 7,253,401 B2 * | 8/2007 | Mickael et al. ............... 250/261 |
| 7,361,886 B2 | 4/2008 | Stoller et al. |
| 7,394,257 B2 | 7/2008 | Martinez et al. |
| 7,482,578 B2 | 1/2009 | Randall |
| 7,538,319 B2 | 5/2009 | Jacobi et al. |
| 7,615,741 B2 | 11/2009 | Jacobi et al. |
| 8,269,162 B2 * | 9/2012 | Kirkwood et al. ......... 250/269.6 |
| 8,455,812 B2 * | 6/2013 | Nikitin et al. ................. 250/256 |
| 2005/0199794 A1 | 9/2005 | Mickael |
| 2013/0214145 A1 * | 8/2013 | Roscoe et al. ............. 250/269.3 |

* cited by examiner

WELL-LOGGING TOOL WITH AZIMUTHAL AND SPECTRAL RADIATION DETECTORS AND RELATED METHODS

BACKGROUND

Radiation detectors, such as gamma-ray detectors, for example, often use a scintillator material which converts energy deposited by a given type of radiation (e.g. gamma-rays) into light. The light is directed to a photodetector, which converts the light generated by the scintillator into an electrical signal. The electrical signal may be used to measure the amount of radiation which is deposited in the crystal.

In the case of well-logging tools for hydrocarbon wells (e.g. gas and oil wells), a borehole gamma-ray detector may be incorporated into the drill string to measure radiation from the geological formation surrounding the borehole to determine information about the geological formation, including the location of gas and oil. Given the harsh operating conditions and space constraints associated with borehole operation, providing scintillator structures which are able to withstand relatively high stress levels and also provide desired operating characteristics may be difficult in some applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Generally speaking, a well-logging tool may be positioned within a borehole of a subterranean formation. The well-logging tool may include a housing having an interior defining a dual-detector receiving chamber extending longitudinally, and having first and second portions, and a first azimuthal radiation detector carried by the first portion of the dual-detector receiving chamber. The first azimuthal radiation detector may include a first gamma-ray detector and a first photodetector associated with the first gamma-ray detector. The well-logging tool may include a second spectral radiation detector carried by the second portion of the dual-detector receiving chamber. The second spectral radiation detector may include a second gamma-ray detector and a second photodetector associated with the second gamma-ray detector.

BRIEF DESCRIPTION OF THE DRAWINGS

Embodiments of well-logging tool are described with reference to the following figures. The same numbers are used throughout the figures to reference like features and components.

DETAILED DESCRIPTION OF THE PREFERRED EMBODIMENTS

The present embodiments will now be described more fully hereinafter with reference to the accompanying drawings, in which preferred embodiments of the disclosure are shown. This present embodiments may, however, be embodied in many different forms and should not be construed as limited to the embodiments set forth herein. Rather, these embodiments are provided so that this disclosure will be thorough and complete, and will fully convey the scope of the present embodiments to those skilled in the art. Like numbers refer to like elements throughout, and prime and multiple prime notations are used to indicate similar elements in alternative embodiments.

Figure 1:
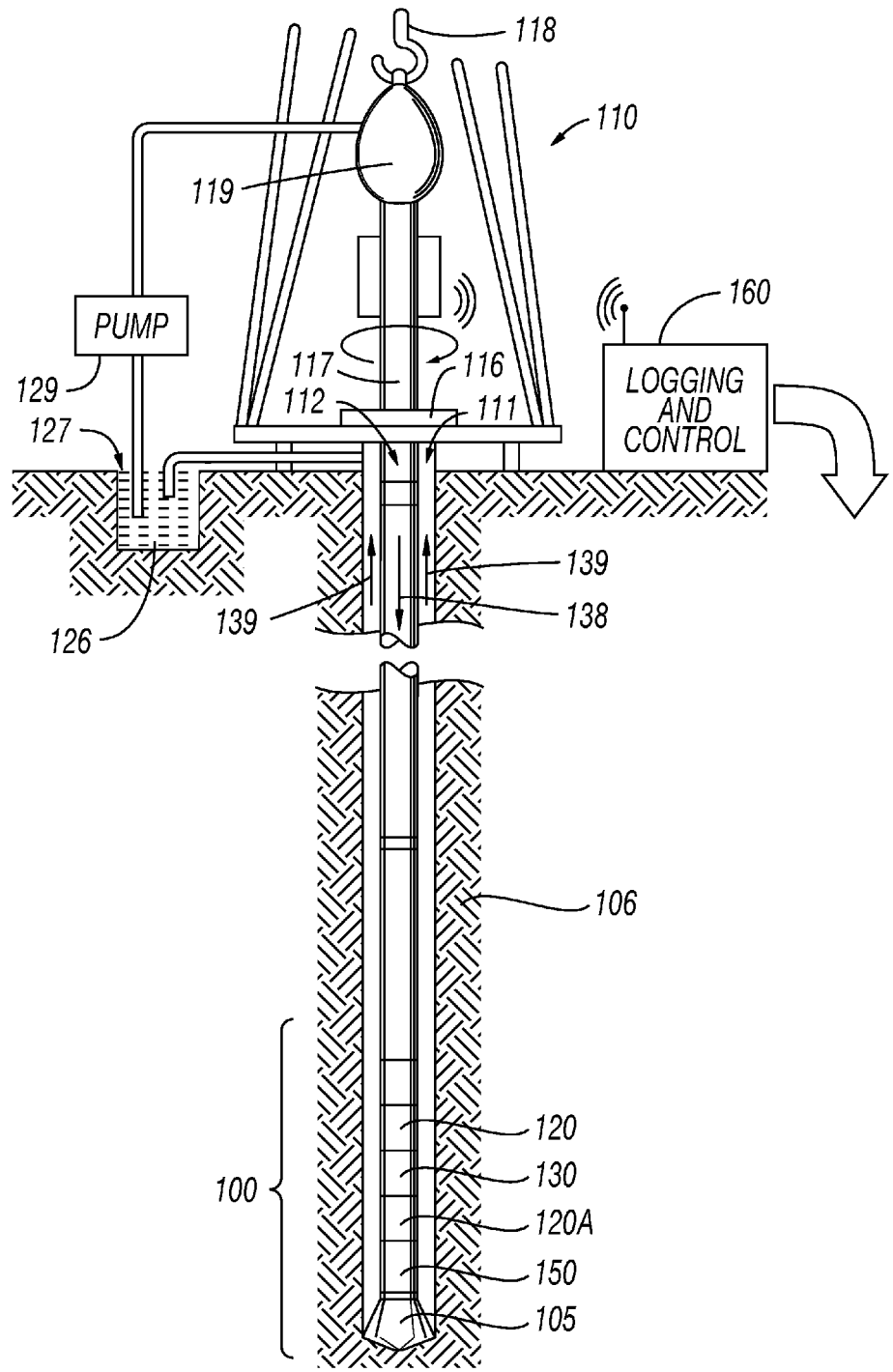
FIG. 1 is a schematic diagram of a well site system which may be used for implementation of an example embodiment.

Referring initially to FIG. 1, a well site system which may be used for implementation of the example embodiments set forth herein is first described. The well site may be onshore or offshore. In this exemplary system, a borehole 111 is formed in subsurface formations 106 by rotary drilling. Embodiments of the disclosure may also use directional drilling, for example.

A drill string 112 is suspended within the borehole 111 and has a bottom hole assembly 100 which includes a drill bit 105 at its lower end. The surface system includes a platform and derrick assembly 110 positioned over the borehole 111, the assembly 110 including a rotary table 116, Kelly 117, hook 118 and rotary swivel 119. The drill string 112 is rotated by the rotary table 116, which engages the Kelly 117 at the upper end of the drill string. The drill string 112 is suspended from a hook 118, attached to a traveling block (not shown), through the Kelly 117 and a rotary swivel 119 which permits rotation of the drill string relative to the hook. A top drive system may also be used in some embodiments.

In the illustrated embodiment, the surface system further includes drilling fluid or mud 126 stored in a pit 127 formed at the well site. A pump 129 delivers the drilling fluid 126 to the interior of the drill string 112 via a port in the swivel 119, causing the drilling fluid to flow downwardly through the drill string 112 as indicated by the directional arrow 138. The drilling fluid exits the drill string 112 via ports in the drill bit 105, and then circulates upwardly through the annulus region between the outside of the drill string and the wall of the borehole 111, as indicated by the directional arrows 139. The drilling fluid lubricates the drill bit 105 and carries formation 106 cuttings up to the surface as it is returned to the pit 127 for recirculation.

In various embodiments, the systems and methods disclosed herein may be used with other conveyance approaches known to those of ordinary skill in the art. For example, the systems and methods disclosed herein may be used with tools or other electronics conveyed by wireline, slickline, drill pipe conveyance, coiled tubing drilling, and/or a while-drilling conveyance interface. For the purpose of an example only, FIG. 1 shows a while-drilling interface. However, systems and methods disclosed herein could apply equally to wireline or other suitable conveyance platforms. The bottom hole assembly 100 of the illustrated embodiment includes a logging-while-drilling (LWD) module 120, a measuring-while-drilling (MWD) module 130, a rotary-steerable system and motor, and drill bit 105.

The LWD module 120 is housed in a drill collar and may include one or a more types of logging tools. It will also be understood that more than one LWD and/or MWD module may be used, e.g. as represented at 120A, 150. (References, throughout, to a module at the position of 120 may alternatively mean a module at the position of 120A as well.) The LWD module may include capabilities for measuring, processing, and storing information, as well as for communicating with the surface equipment, such as the illustrated logging and control station 160. By way of example, the LWD module may include one or more of an electromagnetic device, acoustic device, nuclear magnetic resonance device, nuclear measurement device (e.g. gamma ray, density, photoelectric factor, sigma thermal neutron capture cross-section, neutron porosity), etc., although other measurement devices may also be used.

The MWD module 130 is also housed in a drill collar and may include one or more devices for measuring characteristics of the drill string and drill bit. The MWD tool may further include an apparatus for generating electrical power to the downhole system (not shown). This may include a mud turbine generator powered by the flow of the drilling fluid, it being understood that other power and/or battery systems may be employed. The MWD module may also include one or more of the following types of measuring devices: a weight-on-bit measuring device, a torque measuring device, a shock and vibration measuring device, a temperature measuring device, a pressure measuring device, a rotations-per-minute measuring device, a mud flow rate measuring device, a direction measuring device, and an inclination measuring device.

The above-described borehole tools may be used for collecting measurements of the geological formation adjacent the borehole 111 to determine one or more characteristics of the fluids being displaced within the geological formation 106 in accordance with example embodiments. The system 110 may include a processor 170 for determining such characteristics. The processor 170 may be implemented using a combination of hardware (e.g., microprocessor, etc.) and a non-transitory medium having computer-executable instructions for performing the various operations described herein. It should be noted that the processor 170 may be located at the well site, or it may be remotely located.

By way of background, one of the objectives of formation evaluation (FE) is formation volumetrics, i.e., the quantification of the percentage volumetric fraction of each constituent present in a given sample of formation under study. At the heart of formation volumetrics is the identification of the constituents present, and the corresponding geological model. The constituents are assigned a signature on different log measurements, and log measurements selected are typically optimized to ensure a unique signature per the constituents present. In general, practical considerations such as technology, operating conditions (well geometry, hole size, mud-type, open vs. cased hole, temperature, etc.,), HSE aspects, and economics may restrict the log measurements contemplated. Moreover, homogeneous medium mixing laws are selected based on the intrinsic physics of measurements selected, and three-dimensional geometrical response functions are selected based on the specific tool type and design carrying out the measurement. The individual constituents forward model responses have to be calibrated before the log measurements may be converted into elemental volumetric fractions.

In particular, the operations of identifying and assigning a log signature to the different constituents present (at in-situ conditions) may be a challenge, especially when working with wireline logs with relatively shallow depth of investigation, in the presence of relatively deep depth of invasion (in the case of conventional over-balance drilling). However, whereas identifying the different constituents present may be remedied to some extent through various operations, assigning a unique signature to the different constituents present does not always have an easy solution. This may be due to several factors.

For example, the analysis of rock cuttings brought back to the surface during the drilling process and/or mud logging operations may generally provide geologists and petrophysicists with significant and early clues ("ground truth") as to the identity of the different constituents present, with certain exceptions (depending on mud type). Optional coring operations (which may potentially be costly and impractical) go a step further, to cut and retrieve many feet of formation whole core for further detailed analysis on surface. Downhole advanced elemental spectroscopy logging techniques (e.g., thermal neutron capture spectroscopy logs, fast neutron inelastic scattering spectroscopy logs, elemental neutron activation spectroscopy logs, etc.) may all help account for the matrix constituents, and reduce the formation volumetrics challenge down to just fluid elemental volumetric fractions.

Furthermore, optional formation testing operations (e.g., pressure gradients, downhole fluid analysis, fluid sampling, etc.), despite the limited availability of such station data at discrete depth points, may be considered to test the producible fluid constituents of the formation. Recently introduced advanced multi-dimensional NMR logging techniques may help tell different fluid constituents apart from each other. Another factor may be that logging while drilling (LWD) measurements may be acquired prior to invasion having already progressed too deep inside the formation. Still another factor may be under-balance drilling.

Referring initially to FIGS. 2-5, a well-logging system 10 according to the present disclosure is now described. The well-logging system 10 is illustratively positioned within a borehole 12 of a subterranean formation 11. The well-logging system 10 illustratively includes a well-logging tool 43, a collar 30 surrounding the well-logging tool 43, and a drilling device (not shown) coupled to the collar.

In the illustrated embodiment, the well-logging tool 43 is a LWD device. In other embodiments, the well-logging tool 43 may be a stand alone tool used after the drilling, such as a WL type device. But in other embodiments, other configurations may be used.

The well-logging tool 43 illustratively includes a housing 25 having an interior defining a dual-detector receiving chamber 42 extending longitudinally, and having first 41a and second 41b portions. In some embodiments, the housing 25 may be tubular in shape. In the illustrated embodiment, the housing 25 is cylindrical in shape, but it may comprise other shapes, such as a polygonal shaped tube. In some embodiments, the housing 25 may comprise a pressure housing, which may provide added protection to the well-logging tool 43.

The well-logging tool 43 illustratively includes a first radiation detector 13a carried by the first portion 41a of the dual-detector receiving chamber 42. The first radiation detector 13a comprises a first gamma-ray detector 18a and a first photodetector 15a (e.g. photomultiplier tube) associated therewith. For example, the first gamma-ray detector 18a may comprise at least one of a scintillator crystal and an inorganic scintillator crystal, such as a sodium iodide thallium NaI(Ti) crystal. In other embodiments, the first gamma-ray detector 18a may comprise other materials, such as CsI(Tl), CsI(Na), CsI(pure), CsF, KI(Tl), LiI(Eu). The size of the crystal may be, for example, ¾ inches×6 inches (centered azimuthal gamma-ray detectors (FIGS. 4-5 & 8A)), 1¾ inches×6 inches (spectral gamma-ray detectors), and ¾ inches×4 inches (off-set azimuthal gamma-ray detectors (FIGS. 6-7 & 8B)).

The well-logging tool 43 illustratively includes a second radiation detector 13b carried by the second portion 41b of the dual-detector receiving chamber 42. The second radiation detector 13b comprises a second gamma-ray detector 18b and a second photodetector 15b (e.g. photomultiplier tube) associated therewith. In some embodiments, the first and second gamma-ray detectors 18a-18b may be arranged in end-to-end relation. The first and second radiation detectors 13a-13b may detect natural gamma-ray emissions from the subterranean formation 11. Moreover, although the illustrated embodiment includes the first and second radiation detectors 13a-13b, other embodiments may include more spectral and/or azimuthal radiation detectors Advantageously, by using first and second radiation detectors 13a-13b inside the housing, the well-logging tool 43 and its housing 25 can be readily modified to fit collars of varying sizes. In these embodiments, the well-logging tool 43 includes a plurality of spacers between the housing 25 and the collar 30 (i.e. to fit the outer diameter of the housing to the inner diameter of the collar).

The first and second radiation detectors 13a-13b may be specially tailored to varying logging application. In particular, one or both of the first and second radiation detectors 13a-13b may comprise a spectral gamma-ray detector. Also, one or both of the first and second radiation detectors 13a-13b may comprise an azimuthal gamma-ray detector. In some embodiments, the first and second radiation detectors 13a-13b may be readily removable from the housing 25a, thereby providing a plug-and-play capability to the well-logging tool 43.

In the field, the housing 25a would be configured with first and second radiation detectors 13a-13b to provide the desired measurements for the intended application. For instance, if the best possible spectral gamma measurement is desired, only spectral gamma detectors would be installed. If a spectral as well as azimuthal gamma measurement is needed, both a spectral and an azimuthal detector would be installed.

Advantageously, with the versatility of the well-logging tool 43, each radiation detector may be optimized for its purpose, i.e. whether it is intended to determine azimuthal or spectral radiation characteristics. Also, by combining spectral and azimuthal gamma-ray detectors, a detector arrangement can be optimized for the intended logging application. In other words, the operator of well-logging tool 43 may customize the device for the specific application.

Figure 2:
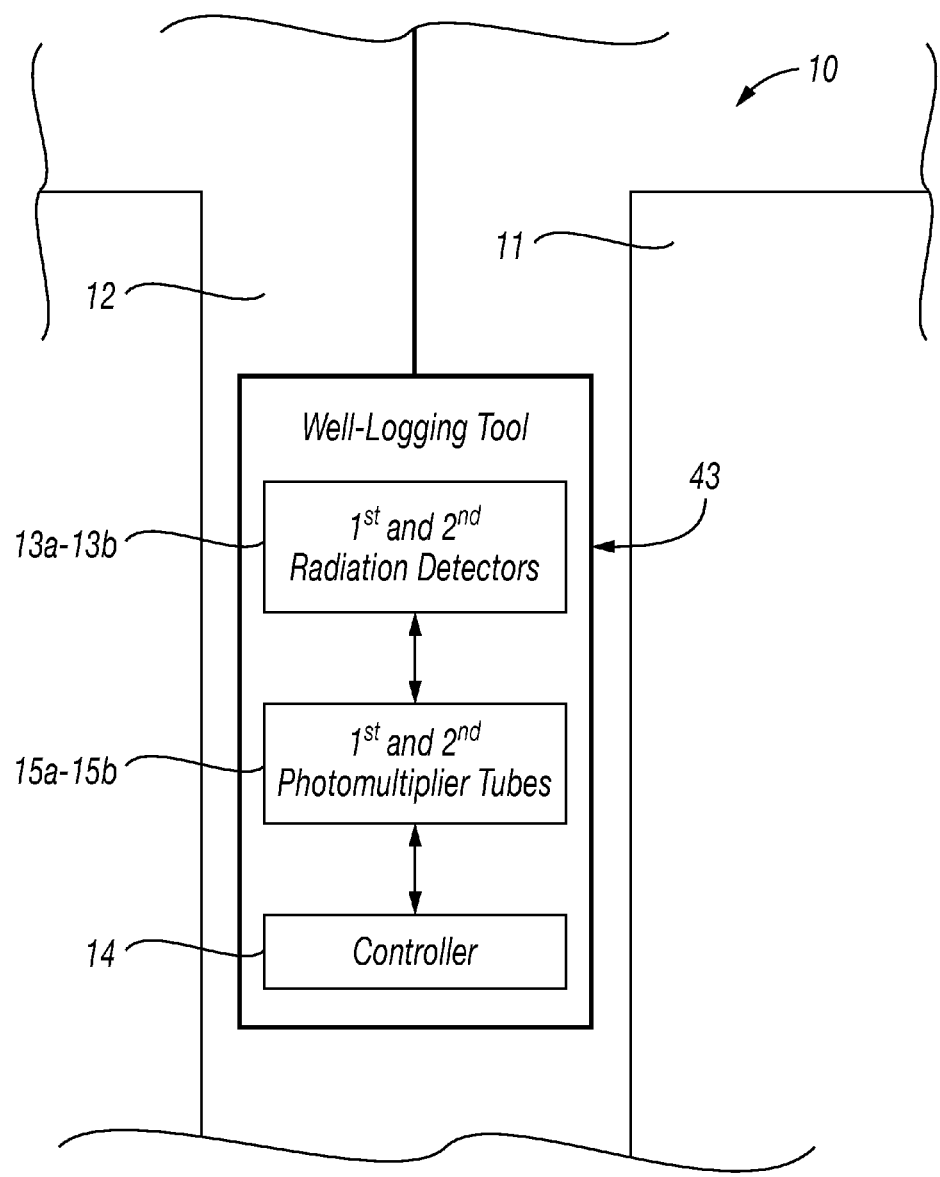
FIG. 2 is a schematic diagram of an embodiment of a well-logging system, according to the present disclosure.

The first radiation detector 13a illustratively includes a controller 14, 14a (i.e. control circuitry) coupled to the photodetector 15a for determining characteristics of the subterranean formation 11 and producing a signal therefor. The controller 14, 14a may comprise processing circuitry for determining the characteristics of the subterranean formation 11. In other embodiments, the well-logging data may be transmitted to the surface for such processing. In the embodiment of FIG. 2, the controllers 14, 14a-14b are illustratively coupled to the respective ones of the first and second photodetectors 15a-15b.

In other embodiments, there may be single controller for both first and second photodetectors 15a-15b, for example being adjacent the first photodetector. In this embodiment, a wire from the second radiation detector 13b past the first radiation detector 13a may be employed.

Figure 3:
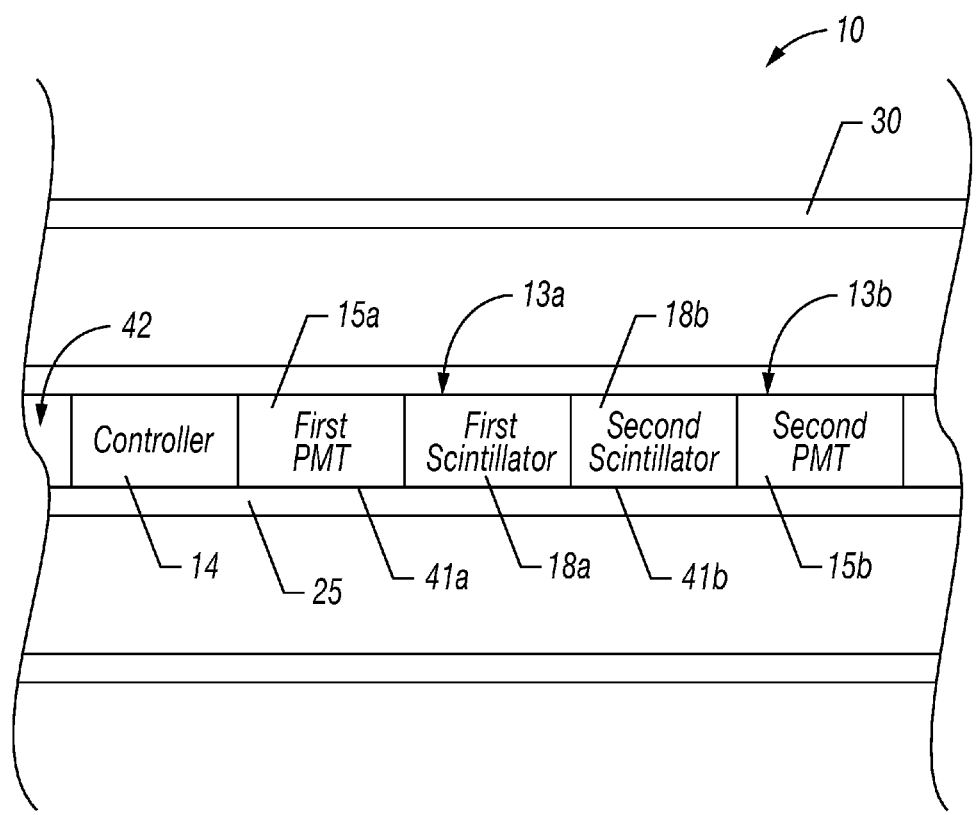
FIG. 3 is a schematic diagram of an embodiment of a well-logging system, according to the present disclosure.
Figure 4:
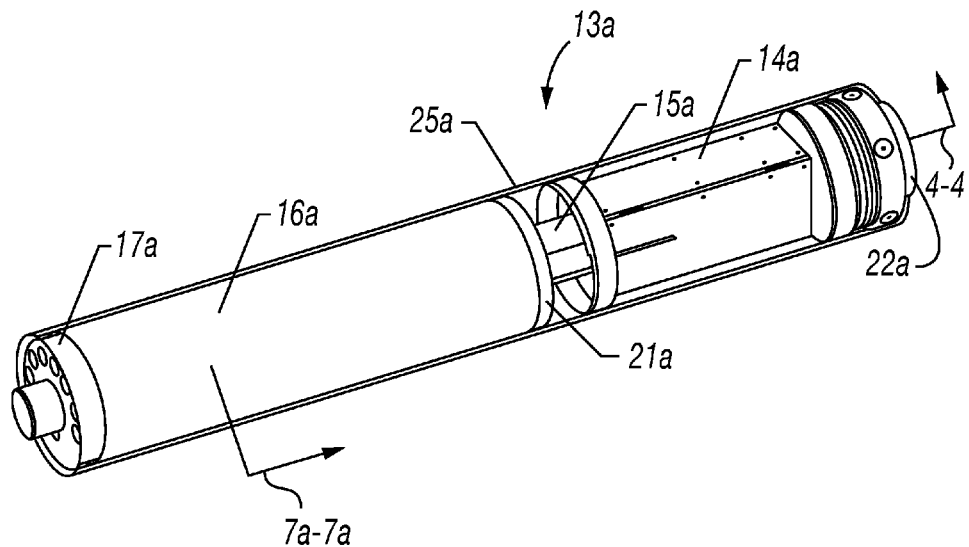
FIG. 4 is a perspective view of a radiation detector in the well-logging tool of FIG. 3.
Figure 5:
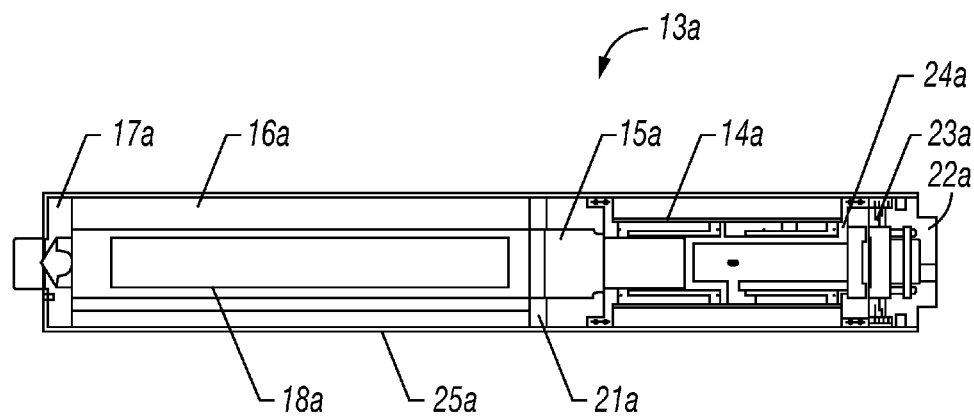
FIG. 5 is a cross-sectional view of the radiation detector of FIG. 4 along line 4-4.

Also, in some embodiments, the first and second radiation detectors 13a-13b can be oriented in opposite longitudinal directions. In these embodiments, the controllers 14, 14a-14b can be situated in between the first and second radiation detectors 13a-13b (i.e. there may be a single controller rather than multiple controllers). Moreover, the order of components shown in FIG. 3 is just one embodiment. The order could be serial, i.e. the first photodetector 15a, first scintillator 18a, second photodetector 15b, and second scintillator 18b.

The first radiation detector 13a illustratively includes adapter plates 17a, 21a, 22a for securing the internal components to the housing 25a. Additionally, the first radiation detector 13a illustratively includes a connector mounting block 24a for carrying the controller 14, 14a, and a first shield 16a partially surrounding the first gamma-ray detector 18a. In some embodiments, the shield 16a may comprise a tungsten material or an alloy thereof. In other embodiments, other materials can be used, so long as they at least attenuate or block gamma-ray radiation.

In the illustrated embodiment, the first radiation detector 13a is an azimuthal gamma-ray detector, i.e. the first shield 16a provides a known directionality to the radiation received from the subterranean formation 11. Also, the first radiation detector 13a illustratively includes a compressed spring 23a between the adapter plate 22a and the connector mounting block 24a. The compressed spring 23a may provide a longitudinal directed biasing for the connector mounting block 24a. Although only the first radiation detector 13a is illustrated in detail, it should be appreciated that the second radiation detector 13b is similarly constituted.

Figure 6:
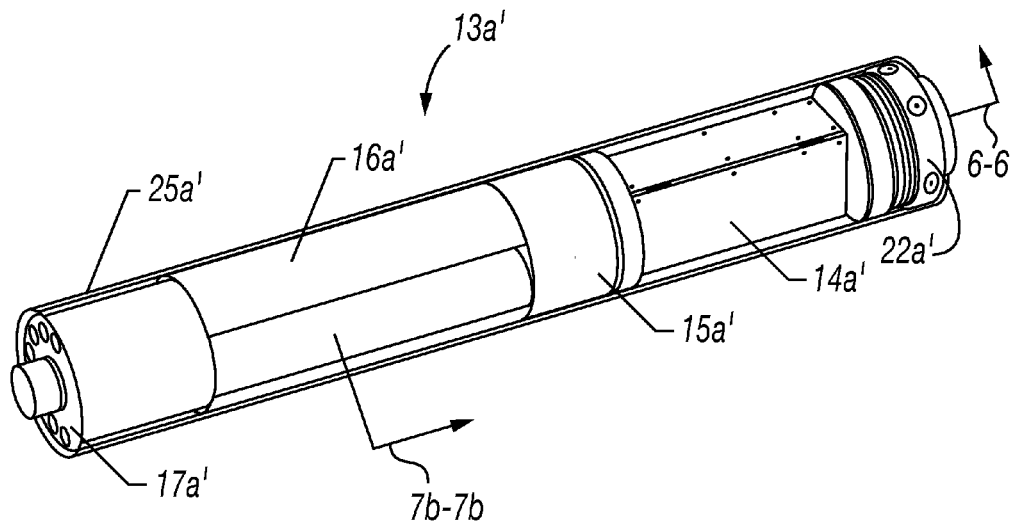
FIG. 6 is a perspective view of another embodiment of an azimuthal radiation detector, according to the present disclosure.
Figure 7:
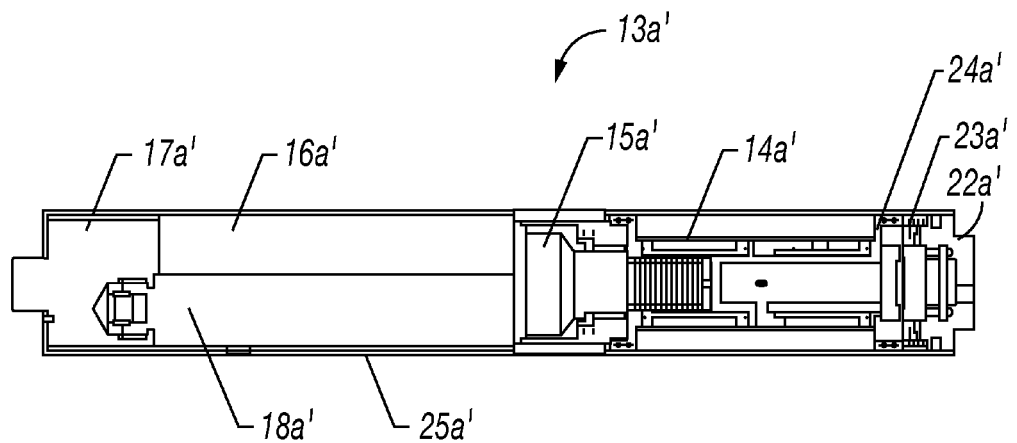
FIG. 7 is a cross-sectional view of the radiation detector of FIG. 6 along line 6-6.
Figures 8A, 8B:
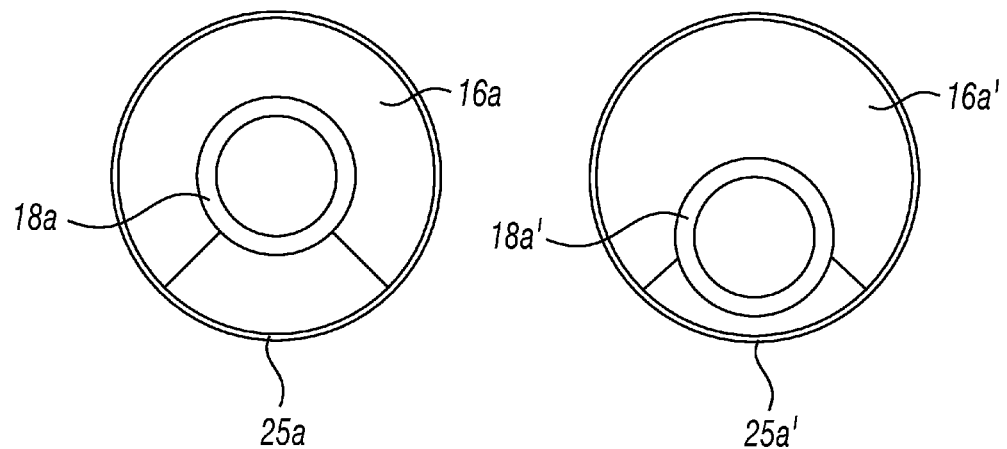
FIGS. 8A-8B are cross-sectional views of the radiation detectors of FIGS. 4 and 6, respectively, and along lines 7A-7A and 7B-7B, respectively.

Referring now additionally to FIG. 8A, the first gamma-ray detector 18a illustratively includes a first scintillator crystal aligned along an axis of the housing 25a. In particular, the first scintillator crystal is illustratively aligned along a center axis of the housing 25a. In other embodiments, the first scintillator crystal may be aligned differently, such as offset (FIGS. 6-7 & 8B).

Another aspect is directed to a method of making a logging tool 43 comprising forming a housing 25 having an interior defining a dual-detector receiving chamber 42 extending longitudinally, and having first and second portions 41a-41b. The method also includes coupling a first radiation detector 13a to be carried by the first portion 41a of the dual-detector receiving chamber 42, the first radiation detector comprising a first gamma-ray detector 18a and a first photodetector 15a associated therewith, and coupling a second radiation detector 13b to be carried by the second portion 41b of the dual-detector receiving chamber, the second radiation detector comprising a second gamma-ray detector 18b and a second photodetector 15b associated therewith.

In some embodiments the first and second radiation detectors 13a-13b are both spectral or azimuthal gamma-ray detectors, the first radiation detector may have different capabilities than the second radiation detector. For example, the first radiation detector 13a (large detector) may have worse spatial resolution but better precision than the second radiation detector 13b (smaller detector having better spatial resolution but worse precision, as compared to the first radiation detector). In other embodiments, the first radiation detector 13a may have a high azimuthal resolution, and the second radiation detector 13b may have a high vertical resolution.

Also, in some embodiments, the first and second radiation detectors 13*a*-13*b* may each comprise a modular unit, making it easy to switch out individual radiation detectors depending on the application. In particular, each of the first and second radiation detectors 13*a*-13*b* is a complete independent electronic unit having a digital input and output for communicating with external components.

Referring now additionally to FIGS. 6-7 and 8B, another embodiment of the first radiation detector 13*a*' is now described. In this embodiment of the first radiation detector 13*a*', those elements already discussed above with respect to FIGS. 2-5 are given prime notation and most require no further discussion herein. This embodiment differs from the previous embodiment in that this first radiation detector 13*a*' has the first scintillator crystal aligned in an offset relation to an axis (i.e. the center axis) of the housing 25*a*'. In some embodiments with offset axis arrangement, high and low azimuthal resolution could be achieved by using the low azimuthal sensitivity but high precision of the larger detector (spectral detector) and the high azimuthal sensitivity of the azimuthal sensor to obtain an enhanced precision image.

Figure 9A:
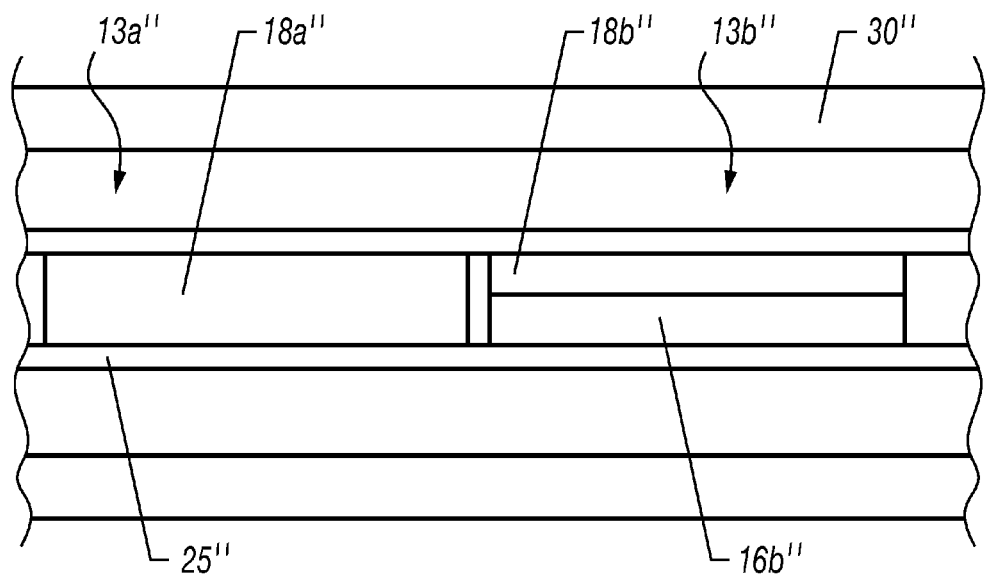
FIGS. 9A-9C are schematic partial cross-sectional views of several embodiments of the well-logging tool, according to the present disclosure.

Referring now additionally to FIG. 9A, another embodiment of the well-logging tool 43" is now described. In this embodiment of the well-logging tool 43", those elements already discussed above with respect to FIGS. 2-5 are given double prime notation and most require no further discussion herein. This well-logging tool 43" illustratively includes the first radiation detector 13*a*" comprising a spectral gamma-ray detector. The second radiation detector 13*b*" comprises an azimuthal gamma-ray detector, and associated shield 16*b*". In this illustrated embodiment, the scintillator of the spectral first radiation detector 18*a*" is physically larger than the scintillator of the azimuthal second radiation detector 18*b*". The size of the scintillator of the spectral first radiation detector 13*a*" provides for increasing the likelihood that high energy gamma rays will be detected and their energy deposited. Advantageously, this embodiment of the well-logging tool 43" provides a hybrid approach to well-logging, offering both spectral and azimuthal logging data from separate radiation detectors. Also, the dual-detector receiving chamber 42" provides adequate spacing to receive both the spectral first radiation detector 13*a*" and the azimuthal second gamma-ray detector, and associated shield 16*b*".

Figure 9B:
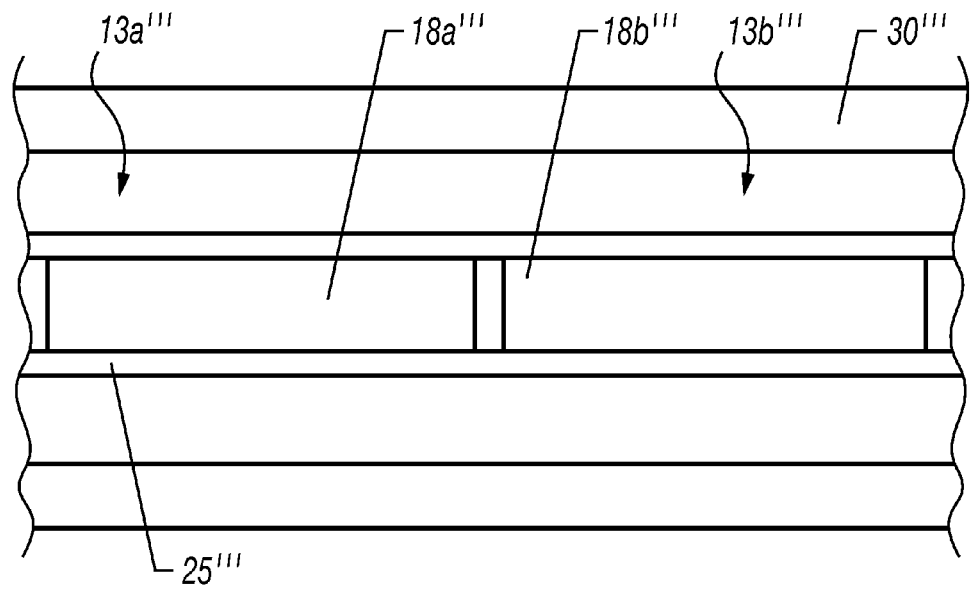

Referring now additionally to FIG. 9B, another embodiment of the well-logging tool 43'" is now described. In this embodiment of the well-logging tool 43'", those elements already discussed above with respect to FIGS. 2-5 are given triple prime notation and most require no further discussion herein. This well-logging tool 43'" illustratively includes both the first and second radiation detectors 13*a*'"-13*b*'" each comprising a spectral gamma-ray detector. Advantageously, for applications where azimuthal readings are not desired, the gamma-ray count rates can be doubled and measurement precision can be improved by using two spectral gamma-ray detectors.

Figure 9C:
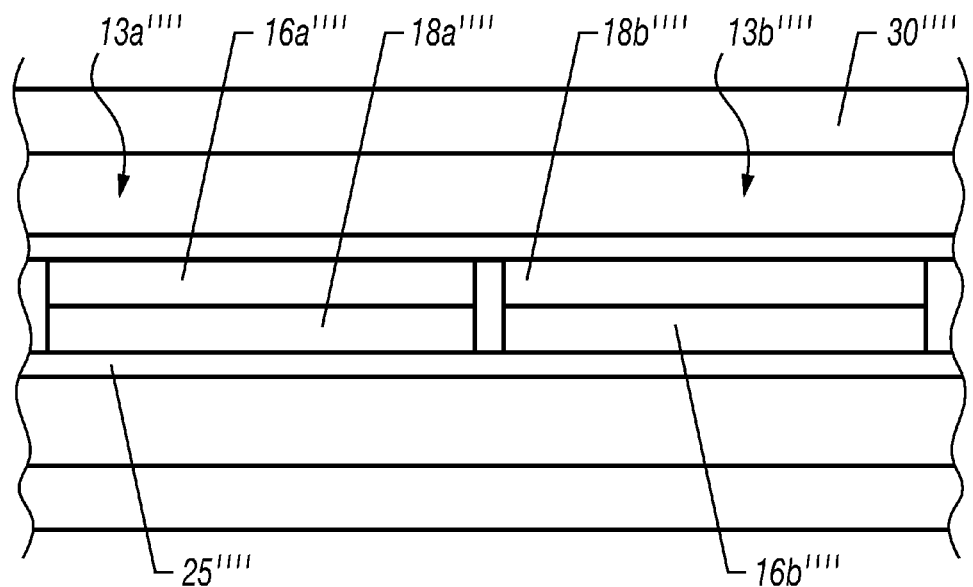

Referring now additionally to FIG. 9C, another embodiment of the well-logging tool 43"" is now described. In this embodiment of the well-logging tool 43"", those elements already discussed above with respect to FIGS. 2-5 are given quadruple prime notation and most require no further discussion herein. This well-logging tool 43"" illustratively includes both the first and second radiation detectors 13*a*""-13*b*"" each comprising azimuthal gamma-ray detectors directed in opposite directions, and associated shields 16*a*""-16*b*"".

Advantageously, the combination of the azimuthal gamma-ray detectors facing in opposite directions, the gamma-ray readings from both directions can be obtained without a controlled spinning of the well-logging tool 43"". For example, this may be helpful when the well-logging tool 43"" is slid down a horizontal borehole 12 along with the drill string in LWD embodiments, i.e. enabling the well-logging tool to look in opposite directions. This is in contrast to other approaches where the well-logging tool rotates so that azimuthal gamma-ray detectors may receive a full picture of the subterranean formation 11.

Of course, in other embodiments, first and second radiation detectors 13*a*""-13*b*"" can be pointed in any arbitrary direction. For example, in some embodiments having four azimuthal radiation detectors, the radiation detectors may be spaced apart 90 degrees. Moreover, in some embodiments, each of the azimuthal radiation detectors could be collimated differently to provide different azimuthal sensitivity. Additionally, enhanced statistical precision could be obtained through alpha-processing or other methods of combining an accurate and a precise measurement.

Many modifications and other embodiments of the present disclosure will come to the mind of one skilled in the art having the benefit of the teachings presented in the foregoing descriptions and the associated drawings. Therefore, it is understood that the present embodiments is not to be limited to the specific embodiments disclosed, and that modifications and embodiments are intended to be included within the scope of the appended claims.

That which is claimed is:

1. A well-logging tool to be positioned within a borehole of a subterranean formation, the well-logging tool comprising:
   a housing having an interior defining a dual-detector receiving chamber extending longitudinally, and having first and second portions;
   a first azimuthal radiation detector carried by the first portion of the dual-detector receiving chamber, said first azimuthal radiation detector comprising a first gamma-ray detector and a first photodetector associated therewith; and
   a second spectral radiation detector carried by the second portion of the dual-detector receiving chamber, said second spectral radiation detector comprising a second gamma-ray detector and a second photodetector associated therewith;
   wherein said second gamma-ray detector is larger than said first gamma-ray detector.

2. The well-logging tool of claim 1 wherein said first azimuthal and second spectral radiation detectors are in end-to-end relation.

3. The well-logging tool of claim 1 wherein said first azimuthal radiation detector comprises a first shield partially surrounding said first gamma-ray detector.

4. The well-logging tool of claim 1 wherein said first gamma-ray detector comprises a first scintillator crystal aligned along an axis of said housing.

5. The well-logging tool of claim 1 comprising at least one controller carried by said housing and coupled to said first and second photodetectors.

6. The well-logging tool of claim 1 wherein said first azimuthal and second spectral radiation detectors are removable from said housing.

7. A well-logging tool to be positioned within a borehole of a subterranean formation, the well-logging tool comprising:
   a housing having an interior defining a dual-detector receiving chamber extending longitudinally, and having first and second portions;
   a first azimuthal radiation detector carried by the first portion of the dual-detector receiving chamber, said first azimuthal radiation detector comprising a first gamma-ray detector and a first photodetector associated therewith; and a second spectral radiation detector carried by the second portion of the dual-detector receiving chamber, said second spectral radiation detector comprising a second gamma-ray detector and a second photodetector associated therewith;

wherein said first gamma-ray detector comprises a first scintillator crystal aligned in an offset relation to an axis of said housing.

8. A well-logging tool to be positioned within a borehole of a subterranean formation, the well-logging tool comprising:

a housing having an interior defining a dual-detector receiving chamber extending longitudinally, and having first and second portions;

a first azimuthal radiation detector carried by the first portion of the dual-detector receiving chamber, said first azimuthal radiation detector comprising a first gamma-ray detector and a first photodetector associated therewith; and a second spectral radiation detector carried by the second portion of the dual-detector receiving chamber, said second spectral radiation detector comprising a second gamma-ray detector and a second photodetector associated therewith, said first and second gamma-ray detectors being in end-to-end relation and being removable from said housing;

wherein said second gamma-ray detector is larger than said first gamma-ray detector.

9. The well-logging tool of claim 8 wherein said first azimuthal radiation detector comprises a shield partially surrounding said first gamma-ray detector.

10. The well-logging tool of claim 8 wherein said second gamma-ray detector comprises a second scintillator crystal aligned along an axis of said housing.

11. The well-logging tool of claim 8 wherein said second gamma-ray detector comprises a second scintillator crystal aligned in an offset relation to an axis of said housing.

12. A method of making a logging tool comprising:

forming a housing having an interior defining a dual-detector receiving chamber extending longitudinally, and having first and second portions;

coupling a first azimuthal radiation detector within the first portion of the dual-detector receiving chamber, the first azimuthal radiation detector comprising a first gamma-ray detector and a first photodetector associated therewith; and coupling a second spectral radiation detector within the second portion of the dual-detector receiving chamber, the second spectral radiation detector comprising a second gamma-ray detector and a second photodetector associated therewith;

wherein the first gamma-ray detector comprises a first scintillator crystal aligned in an offset relation to an axis of the housing.

13. The method of claim 12 comprising coupling the first and second gamma-ray detectors in end-to-end relation.

14. The method of claim 12 wherein the first azimuthal radiation detector comprises a first shield partially surrounding the first gamma-ray detector.

15. The method of claim 12 wherein the first gamma-ray detector comprises a first scintillator crystal aligned along an axis of the housing.

16. The method of claim 12 comprising coupling at least one controller to the first and second photodetectors.

17. The method of claim 12 wherein the first azimuthal and second spectral radiation detectors are removable from the housing.

* * * * *